(12) United States Patent
Huang et al.

(10) Patent No.: US 9,244,202 B2
(45) Date of Patent: Jan. 26, 2016

(54) MICROLENS ARRAY AND A METHOD OF FABRICATING THEREOF

(71) Applicant: Nanyang Technological University, Singapore (SG)

(72) Inventors: Weimin Huang, Singapore (SG); Yong Zhao, Singapore (SG)

(73) Assignee: NANYANG TECHNOLOGICAL UNIVERSITY, Singapore (SG)

(*) Notice: Subject to any disclaimer, the term of this patent is extended or adjusted under 35 U.S.C. 154(b) by 75 days.

(21) Appl. No.: 14/360,303

(22) PCT Filed: Nov. 30, 2012

(86) PCT No.: PCT/SG2012/000453
§ 371 (c)(1),
(2) Date: May 22, 2014

(87) PCT Pub. No.: WO2013/081555
PCT Pub. Date: Jun. 6, 2013

(65) Prior Publication Data
US 2014/0327969 A1    Nov. 6, 2014

Related U.S. Application Data

(60) Provisional application No. 61/565,679, filed on Dec. 1, 2011.

(51) Int. Cl.
*G02B 27/10* (2006.01)
*G02B 3/00* (2006.01)
(Continued)

(52) U.S. Cl.
CPC .............. *G02B 3/0018* (2013.01); *B29C 59/16* (2013.01); *B29C 59/18* (2013.01); *B29C 61/00* (2013.01); *B29C 69/02* (2013.01); *B29D 11/00365* (2013.01); *G02B 1/04* (2013.01);
(Continued)

(58) Field of Classification Search
CPC ........ G02B 1/04; G02B 1/041; G02B 3/0018; C08L 33/10; B29C 2035/0838; B29C 59/16; B29C 59/18; B29C 61/00; B29C 69/02; B29L 2011/0016
USPC .......... 359/619–620, 623; 624/1.1, 1.32, 1.34
See application file for complete search history.

(56) References Cited

U.S. PATENT DOCUMENTS

2008/0024872 A1* 1/2008 Dunn ..................... G01K 5/483
539/619

OTHER PUBLICATIONS

Chen, Y-P, et al., Fabrication and characterization of multi-scale microlens arrays with anti-reflection and diffusion properties, Nanotechnology 22 (2011) 215303.
(Continued)

*Primary Examiner* — Thomas K Pham
*Assistant Examiner* — Vipin Patel

(57) ABSTRACT

A method of fabricating a microlens array, the method comprising the steps of: compressing a shape memory polymer substrate with a predetermined load; indenting the shape memory polymer substrate to form an array of micro-indents; immersing the shape memory polymer substrate in a solvent capable of causing stress-enhanced swelling in the shape memory polymer substrate such that the array of micro-indents forms a corresponding array of micro-protrusions on the shape memory polymer substrate due to the stress-enhanced swelling of the micro-indents; and heating the shape memory polymer substrate to form at least one curved surface of the shape memory polymer substrate under the micro-protrusion array.

15 Claims, 6 Drawing Sheets

(a)

(b)

(c)

(d)

(51) Int. Cl.
  *B29C 59/18* (2006.01)
  *G02B 1/04* (2006.01)
  *B29D 11/00* (2006.01)
  *B29C 59/16* (2006.01)
  *B29C 61/00* (2006.01)
  *B29C 69/02* (2006.01)
  *B29C 35/08* (2006.01)
  *B29K 33/00* (2006.01)
  *B29K 105/00* (2006.01)
  *B29L 11/00* (2006.01)

(52) U.S. Cl.
  CPC ........ *G02B 1/041* (2013.01); *B29C 2035/0838* (2013.01); *B29K 2033/12* (2013.01); *B29K 2105/253* (2013.01); *B29K 2995/0068* (2013.01); *B29L 2011/0016* (2013.01)

(56) References Cited

OTHER PUBLICATIONS

Chen, Y-P, et al., Fabricating a silicon microlens mold by ICP dry etching, Lasers and optics 2003, CLEO/Pacific Rim, The 5th Annual Conference, vol. 2, p. 565.

Foreign Communication From a Related Counterpart Application, International Search Report and Written Opinion dated Feb. 15, 2013, International Application No. PCT/SG12/00453 filed on Nov. 30, 2012.

Foreign Communication From a Related Counterpart Application, International Preliminary Report on Patentability dated Jun. 12, 2014, International Application No. PCT/SG12/00453 filed on Nov. 30, 2012.

\* cited by examiner

MICROLENS ARRAY AND A METHOD OF FABRICATING THEREOF

CROSS-REFERENCE TO RELATED APPLICATIONS

This application is a filing under 35 U.S.C. 371 as the National Stage of International Application No. PCT/SG2012/000453, filed Nov. 30, 2012, entitled "A MICROLENS ARRAY AND A METHOD OF FABRICATING THEREOF", which claims the benefit of and priority to U.S. Provisional Patent Application No. 61/565,679, filed Dec. 1, 2011, both of which are incorporated herein by reference in their entirety for all purposes.

TECHNICAL FIELD

The present invention relates to a microlens array and a simplified and cost-effective method of fabricating thereof.

BACKGROUND

The design of conventional cameras is based on bionic study of the vertebrate eye (single-aperture optics), which can provide a faithful rendering of the visual world with a high resolution. However, it is difficult to obtain a wide field of view and extract motion-related information by such vision systems.

In contrast to the vertebrate eye, the insect compound eye consists of a curved microlens array which comprises a plurality of microlenses provided on a curved surface. This is very efficient for local and global motion analysis over a large field-of-view (FOV) although it offers a comparatively lower resolution.

The advantages of a microlens array (or compound eye) which comprises a plurality of microlenses provided on a curved surface include: a very large FOV, high motion sensitivity, accurate and fast navigation in three-dimensional (3D) dynamic environments, small volume, light weight, nearly infinite depth-of-field (DOF) AND SO ON. The microlens array (MLA) is a useful optical element with wide applications in liquid crystal display, wavefront sensor, image recorder, optical signal processing, and interconnection, etc.

Due to the above-mentioned advantages, an artificial vision system based on a compound MLA will be a radically different alternative to conventional cameras and will provide more efficient visual ability for large FOV imaging and motion analysis.

The fabrication of MLAs in a low cost, highly efficient and highly reliable way is of great interest to many engineering applications. A number of methods have been reported so far. Apart from conventional injection moulding, fluidic lens, slow tool servo method and roller imprinting are some among others. All of these methods are more applicable for larger sized lenses (i.e., where lens diameters are in the millimeter and above scale). It is difficult to make micro sized lenses (i.e., with a diameter less than 100 µm) due to reasons, such as high flow resistance during micro-scale injection moulding (i.e. filling in micro channel/mould), difficulties in master mould fabrication, soft lithography, ultraprecision machining and position control for 3D and micro-scale device fabrication, and expensive and complex procedure for microlens fabrication by conventional semiconductor processing methods.

Some special techniques have been developed for fabricating small sized lens arrays, such as ink-jet printing, soft lithography, electrohydrodynamic instability method, and some novel liquid/solvent approaches, etc. However, all these methods require the fabrication of a pre-patterned mould/mask by semiconductor processing techniques (e.g. lithography and etching), which is expensive and complicated.

The fabrication of compound microlens arrays which comprise a plurality of microlenses provided on a curved surface in a simple and cost-effective way is therefore still in great demand.

SUMMARY

The present invention overcomes the above identified fabrication challenges for compound microlens arrays and proposes an integration of basic methods for the fabrication of these arrays.

According to a first exemplary aspect, there is provided a method of fabricating a microlens array, the method comprising the steps of: compressing a shape memory polymer substrate with a predetermined load; indenting the shape memory polymer substrate to form an array of micro-indents; immersing the shape memory polymer substrate in a solvent capable of causing stress-enhanced swelling in the shape memory polymer substrate such that the array of micro-indents forms a corresponding array of micro-protrusions on the shape memory polymer substrate due to the stress-enhanced swelling of the micro-indents; and heating the shape memory polymer substrate to form at least one curved surface of the shape memory polymer substrate under the micro-protrusion array.

The heating may be at a heating temperature of about 120° C.

The heating temperature may be applied for a period of about 1 to about 5 minutes.

The heating may comprise local heating.

The local heating may be applied at a plurality of locations on the micro-protrusion array to form a plurality of curved surfaces of the shape memory polymer substrate under the micro-protrusion array.

The local heating may be provided by a laser.

The shape memory polymer substrate may have a curved surface before the compressing.

The compressing may leave a first residual stress field in the shape memory polymer substrate and the indenting may leave a second residual stress field in the shape memory polymer substrate, wherein the stress-enhanced swelling occurs when the second residual stress field is greater than the first residual stress field.

The solvent bath may comprise ethanol at 95% concentration at a temperature of about 22° C.

The method may further comprise, before the heating, stabilising the micro-protrusion array in an oven after removal of the micro-protrusion array from the solvent.

The stabilising may be at a stabilising temperature in the range of about 60° C. to about 100° C.

The stabilising temperature may be applied for a period ranging from about a few minutes to 24 hours.

Each of the micro-protrusions may have a diameter of about 40 µm and a height of about 1 µm.

The method of claim 14, wherein the focal length of each microlens is about 500 µm.

According to a second exemplary aspect, there is provided a microlens array comprising: an array of micro-protrusions formed on at least one curved surface of a shape memory polymer substrate, each micro-protrusion forming a microlens.

The microlens array may be fabricated according to the method of the first aspect.

For both aspects, the shape memory polymer substrate may comprise polymethyl methacrylate (PMMA).

BRIEF DESCRIPTION OF THE DRAWINGS

In order for the invention to be fully understood and readily put into practical effect there shall now be described by way of non-limitative example only exemplary embodiments, the description being with reference to the accompanying illustrative drawings.

In the drawings:

FIG. 1 (b1) is a schematic representation of a spherical indent and corresponding protrusion formed according to the method of the present invention;

FIGS. 1 (a2) and (b2) are optical profile images of the spherical indent and corresponding protrusion, respectively, of FIGS. 1 (a1) and (b1);

FIG. 1 (a3) is a schematic representation of the formation of an indent made by a square pyramid indenter according to the method of the present invention;

FIG. 1 (b3) is a schematic representation of a square pyramid indent and corresponding protrusion formed according to the method of the present invention;

FIGS. 1 (a4) and (b4) are optical profile images of the square pyramid indent and corresponding protrusion, respectively, of FIGS. 1 (a3) and (b3);

FIGS. 2 (b1) and (b2) are the corresponding resultant lens arrays after the indent arrays of FIGS. 2 (a1) and (a2) have been immersed in ethanol according to the method of the present invention;

FIG. 2 (c1) is a cross-sectional view of the indents and protrusions of FIGS. 2 (a1), (a2), (b1), and (b2) fabricated according to the method of the present invention;

FIG. 2 (c2) charts the evolution process from indent to protrusion after being immersed in ethanol for different periods of time;

FIG. 3 (a2) is a surface profile of the resultant MLA from immersion of the indent array of FIG. 3 (a1) in ethanol for 24 hours;

FIGS. 3 (a3) and (a4) are surface profiles of the resultant MLA of FIG. 3 (a2) in an oven for 168 hours at 25° C. and 24 hours at 60° C., respectively, according to the method of the present invention;

FIG. 3 (b) is a plot comparing the protrusion profiles obtained after stabilization in a 60° C. oven for 24, 168 and 360 hours, according to the method of the present invention;

FIG. 3 (c) is a plot of the evolution of the centre points of three different sized indents/protrusions over the fabrication process steps according to the present invention (i.e. after indentation, immersion in ethanol, and oven stabilisation);

FIGS. 4 (b1) and (b2) are focus spots and projected images, respectively, through the MLA in FIG. 2 (b1);

FIGS. 4 (c1) and (c2) are focus spots and projected images, respectively, through the MLA in FIG. 2 (b2);

DETAILED DESCRIPTION

The fabrication method of compound microlens arrays as disclosed in the present invention may comprise an integration of two basic methods. The first being microlens array fabrication based on a residual strain/stress-enhanced-swelling effect in pre-deformed poly(methyl methacrylate) (PMMA) upon immersing into ethanol where the volume swelling ratio is a function of residual stress and time, and where immersion in ethanol for a period of time causes the volume swelling ratio to increase as residual stress increases. The second is the formation of a curved substrate based on the excellent shape memory effect in commercially available optical polymer PMMA, where the shape recovery process depends on pre-deformation history and heating temperature.

Through a combination of these two approaches, compound microlens arrays (artificial compound eye) which comprise a plurality of microlenses provided on a curved surface can be fabricated by different procedures according to the present invention.

Fabrication of Individual Micro Protrusions

Figure 1:
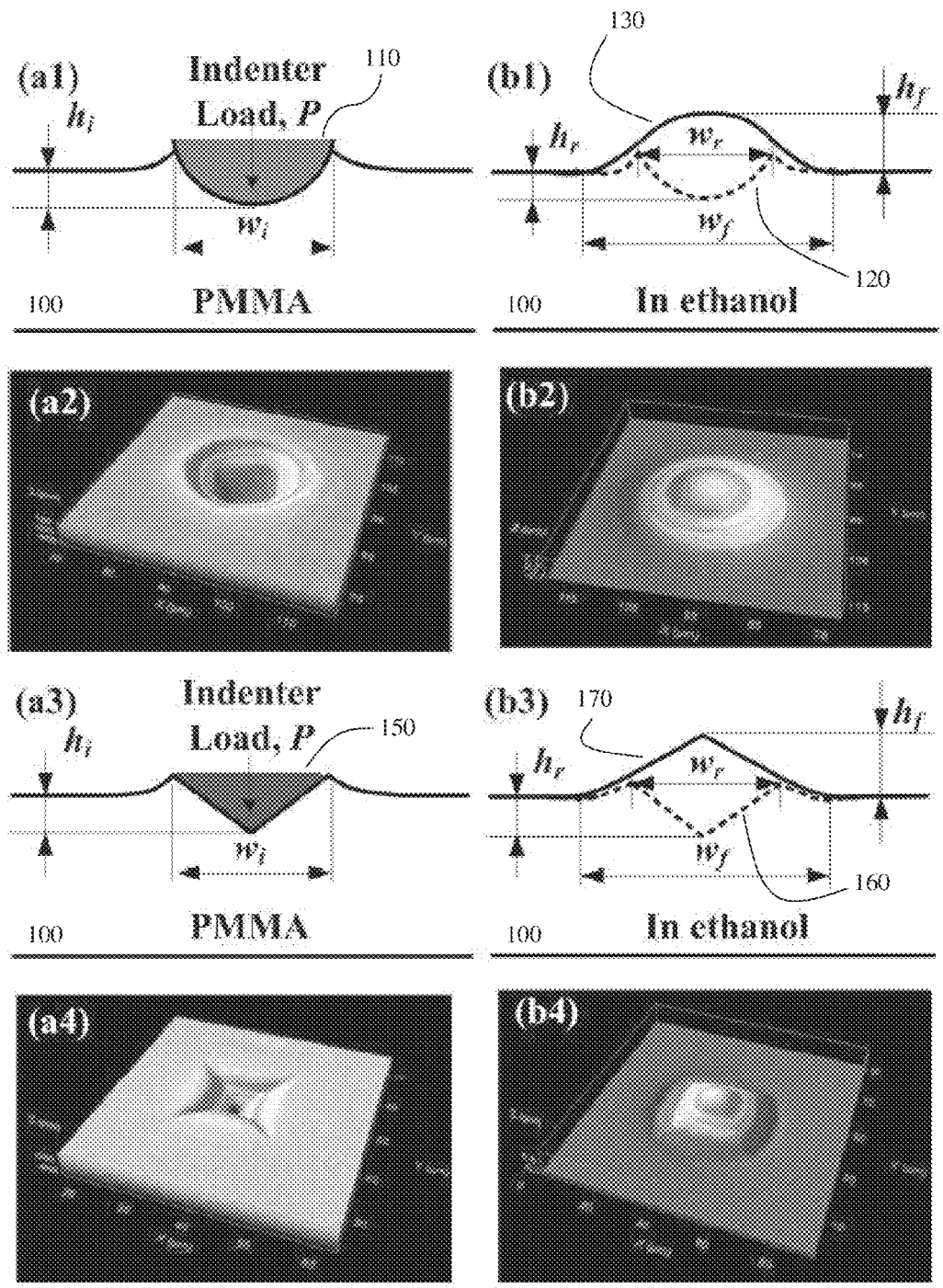
FIG. 1 (a1) is a schematic representation of the formation of an indent made by a spherical conical indenter according to the method of the present invention.

FIG. 1 shows an exemplary fabrication procedure of micro protrusions. A cast PMMA sheet 100 with a thickness of 1 mm and a glass transition temperature of 110° C. (from Ying Kwang Acrylic, Singapore) was cut into small pieces for our experiments. A micro hardness tester (CSM instruments) was used to make two different shaped indents atop PMMA at room temperature (refer to FIGS. 1 (a1) and (a3)). In one embodiment of the present invention, the indenter is a spherical conical diamond indenter 110 with a radius of 20 and a conical angle of 90°. In another embodiment of the present invention, the indenter is a square pyramid indenter 150, with an angle of 130° between two edges. All indentation tests were conducted at room temperature (about 22° C.) with a maximum load of 150 mN and a loading/unloading speed of 5 mN/s (with 10 s holding time between loading and unloading). The resulted indents were characterized by an optical imaging profiler (Sensofar® PLu), which is a combination of confocal and interferometry techniques, as shown in FIGS. 1 (a2) and (a4).

Upon indented to a maximum load of P, the corresponding maximum depth and diameter/width of the indent are denoted as $h_i$ and $w_i$, respectively (as shown in FIGS. 1 (a1) and (a3)). After indentation, the residual maximum depth and diameter/width of indent are denoted as $h_r$ and $w_r$, respectively (as shown in FIGS. 1 (b1) and (b3)). Subsequently, the PMMA samples 100 were immersed in room temperature ethanol (concentration 95%) for 24 hours. FIGS. 1 (b1) and (b3) show ethanol induced protrusions 130, 170 atop PMMA samples 100 with a height of $h_t$ and diameter (width) of $w_t$ obtained using the method of the present invention. A spherical indent 110 results in a spherical protrusion 130 (FIG. 1 (b2)); while a pyramid indent 150 produces a pyramid protrusion 170 (FIG. 1 (b4)). The formation of protrusions 130, 170 is a result of residual stress (in the indents 110, 150) enhanced swelling during absorption of ethanol by PMMA.

Fabrication of Microlens Array and Thermal Stability

Figure 2:
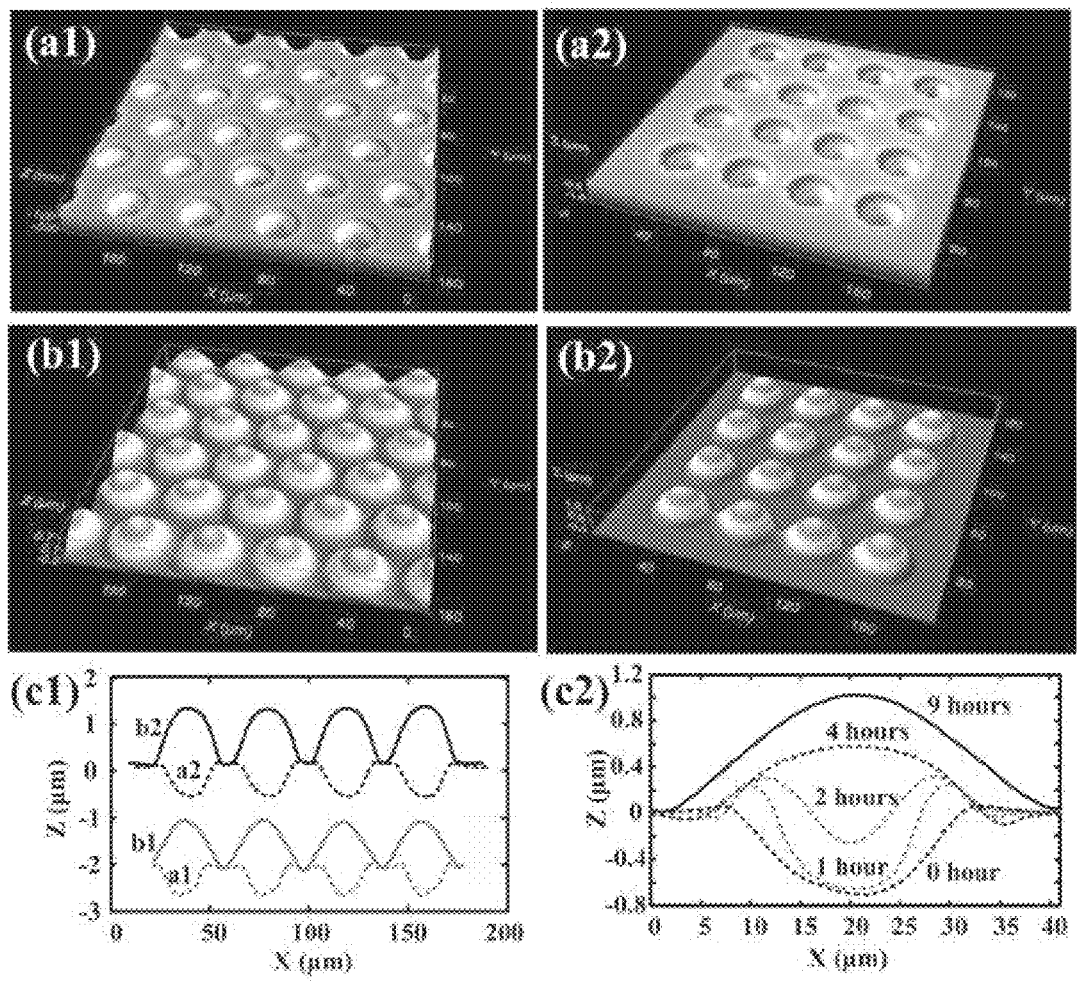
FIGS. 2 (a1) and (a2) are two indent arrays with different patterns/density fabricated atop PMMA according to the method of the present invention.

The simple two-step method discussed above can be utilized in the fabrication of MLAs according to the present invention. This is shown in FIG. 2. First, two indent arrays with different patterns/density were fabricated atop two pieces of PMMA (refer to FIGS. 2 (*a*1) and (*a*2)); and then these samples of indented PMMA were immersed into room temperature ethanol, which resulted in formation of lens arrays on the PMMA with different patterns after 9 hours (FIGS. 2 (*b*1) and (*b*2)). Cross-sectional views of indents/protrusions are presented in FIG. 2 (*c*1) for comparison. These lenses are well ordered, densely packed and have an individual size of about 40 μm ($w_f$) in diameter and a height ($h_f$) of about 1 μm (refer to FIG. 1 for definitions of $w_f$ and $h_f$). Appreciably, lenses with smaller or greater diameters and heights as desired may also be fabricated using the same method by appropriately modifying the size of the indenters used to fabricate the indent arrays.

FIG. 2 (*c*2) further reveals the evolution process from indent to protrusion after being immersed into ethanol for different periods of time according to the method of the present invention. As indentation was conducted at room temperature, at which PMMA is hard, the resulted spherical indent is actually pile-up. Upon immersing into ethanol, pile-up grows gradually before spherical protrusion is finally formed (after about 4-hour immersion) and then grows (a useful phenomenon, which can be used to control the density of lenses array and size of lenses, and consequently, to manipulate curvature, conic constant and focus length of lens). As can be seen, after 9 hours, $w_f$ is about 40 μm, which is about doubled from $w_r$; while $h_f$ is about 1 μm, which is about 0.5 times larger than $h_r$.

Since the method of the present invention is based or dependent on swelling of PMMA upon immersing into ethanol, desorption of ethanol may be an issue which brings the reliability issue of these MLAs into question. To address this point, different sized spherical lenses were fabricated on different PMMA samples following the above two-step method and then put inside an oven of 25° C. or 60° C.

Figure 3:
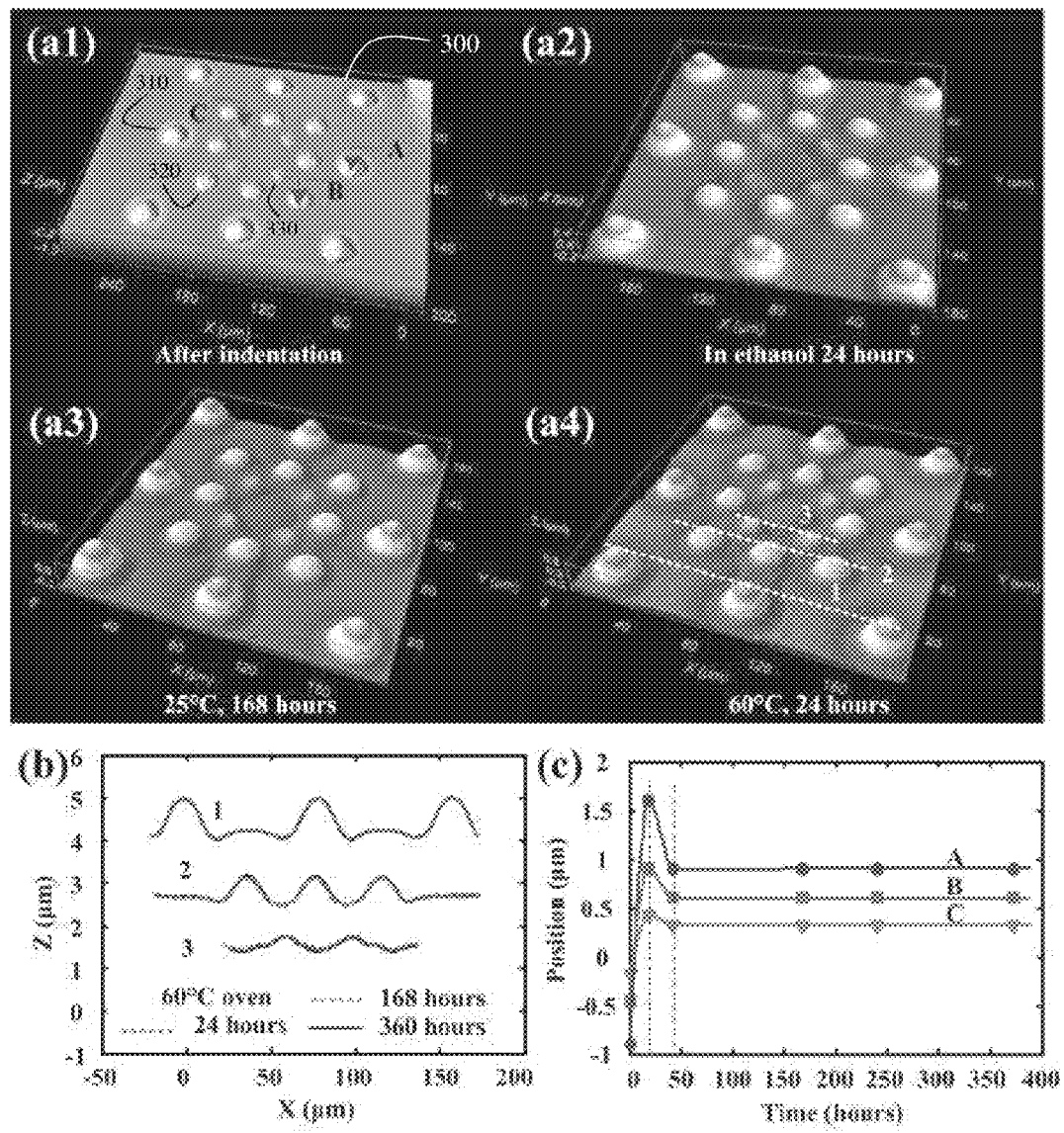
FIG. 3 (a1) is a surface profile of an indent array in which three different sized indents were made by a 20 µm spherical indenter under three maximum loads formed according to the method of the present invention.

FIG. 3 (*a*1) shows surface profile of an indent array 300 according to an embodiment of the present invention, in which three different sized indents (marked 1, 2 and 3 in FIG. 3 (*a*4)) were made by a 20 μm spherical indenter under three different maximum loads (namely, 150 mN, 100 mN and 80 mN, respectively). FIG. 3 (*a*2) reveals the surface profile of the resulting MLA after immersion in ethanol for 24 hours. FIGS. 3 (*a*3) and (*a*4) present two typical MLA surface profiles after being kept inside an oven for a thermal stability test. It was found that MLAs were stabilized after 168 hours inside a 25° C. oven, while stabilization took 24 hours if the oven temperature was set to be 60° C. It should be noted that heating can be at high temperatures for stabilization over a shorter period of time, or at low temperatures over a longer period of time. For example, for stabilization, heating temperature can range from 60° C. to 100° C., and heating time can range from a few hours to a couple of minutes. Thus, a higher temperature will require a shorter heating time for stabilization to occur.

FIG. 3 (*b*) compares the profiles of lenses after 24, 168 and 360 hours inside 60° C. oven. It is concluded that all three sized lens arrays are stable after 24 hours at 60° C. FIG. 3 (*c*) plots the evolution of the center points of three different sized indents/protrusions (depth/height) against time of the whole process (i.e., after indentation, immersion in ethanol and placed in a 60° C. oven). It can be seen that there are three major stages during the whole process. The first is the gradual formation of micro lens during immersion in ethanol (from indent to protrusion in 24 hours). Relaxation due to desorption of ethanol is followed (decrease in protrusion height in 60° C. oven for 24 hours). After this, MLA becomes stable (no visible change in height in 60° C. air for 360 hours).

The stabilized MLA (FIG. 2(*b*1)), after being put in a 60° C. oven for 24 hours, have protrusions with a diameter of 39.95±0.55 μm, a center-to-center distance of 40 μm and a sag height of 0.8±0.02 μm.

MLA Characterization

Figure 4:
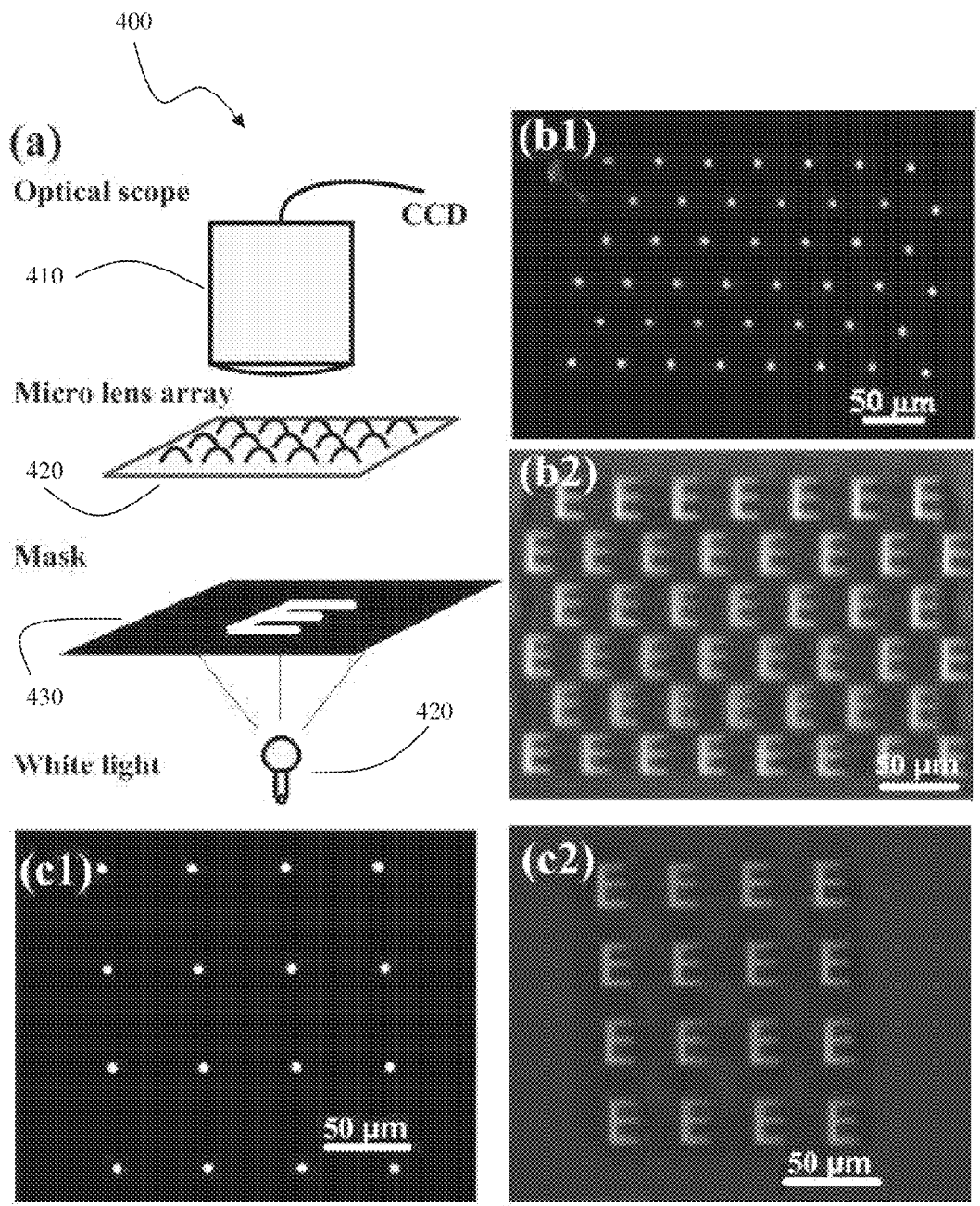
FIG. 4 (a) is a schematic illustrating the experimental setup used for projection through an MLA fabricated according to the method of the present invention.

Projection experiment was conducted on stabilized MLAs. FIG. 4 (*a*) shows the experimental setup 400 used. The optical scope 410 is a microscope (Axiotech 100 HD, Zeiss). A PMMA MLA 420 was placed atop a stage and illuminated with white light 440 from bottom through a mask 430 with a letter E (size 12×18 mm) in the middle. The projected image at the top was recorded by a CCD system. FIGS. 4 (*b*) and (*c*) shows the focus spot and projected images through two MLAs (as shown in FIGS. 2 (*b*1) and (*b*2)). The focus length of these MLAs measured to be 500 μm by this optical microscope system 400. It can be seen that letter Es are clearly projected.

For an ideal spherical curve, the radius R, focal length f, and numerical aperture NA of the lens can be calculated from $$R = \frac{w_f^2 + 4h_f^2}{8h_f}, f = \frac{R}{n-1}, NA = \frac{w_f}{2f} \quad (1)$$

where $w_f$, $h_f$ and n are the diameter, the sag height and the refractive index of PMMA, respectively. For PMMA used in these experiments, n is about 1.49.

For the MLAs shown in FIG. 4, the calculated radius is 249.8 μm, the focal length is 508.3 μm (close to the measured value of 500 μm) and the numerical aperture is 0.04. For the three types of MLAs (1, 2 and 3) shown in FIG. 3 (*a*4), the calculated radii are 120, 130 and 210 μm, respectively; the focal lengths are 240, 260 and 440 μm, respectively; and the numerical apertures are 0.055, 0.043 and 0.021, respectively. The numerical aperture is related to fabrication parameters. The theoretical maximum numerical aperture is 0.35 using the spherical conical indenter 110 disclosed above.

Fabrication of Compound Microlens Arrays

The fabrication method of compound microlens array according to an embodiment of the present invention is an integration of the above disclosed method (where fabrication is based on a residual strain/stress-enhanced-swelling effect in pre-deformed PMMA upon immersing into ethanol where the volume swelling ratio is a function of residual stress and time, followed by immersion in ethanol for a certain period of time, where the volume swelling ratio is increased as the residual stress increases), and the formation of a curved substrate based on the shape memory effect in PMMA where the shape recovery process depends on pre-deformation history and heating temperature.

By integrating these two approaches, a compound microlens array (artificial compound eye) can be fabricated according to the present invention. Exemplary embodiments of the method of the present invention are described by, but not limited to, procedures A and B below:

Procedure A

Figure 5:
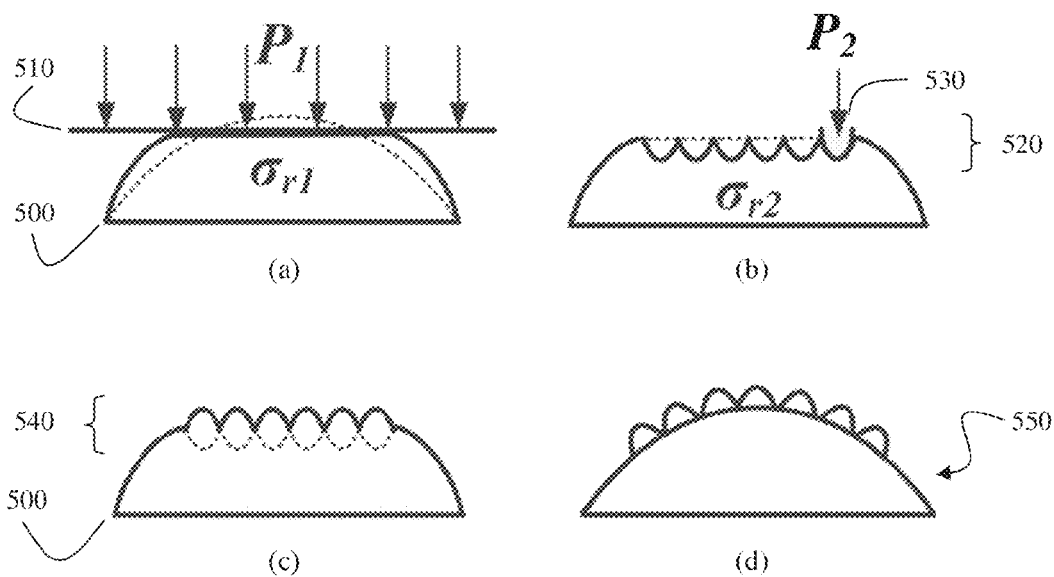
FIG. 5 is a schematic diagram showing the fabrication of compound MLAs according to Procedure A of the present invention.

Step 1: In a first embodiment of the present invention, a curved (e.g. hemi-spherical or hemi-cylindrical) PMMA sample 500 is compressed by a maximum load, $P_1$ (using an Instron testing machine 510, for example). After a loading/unloading process, a residual stress field, $\sigma_{r1}$, is stored in the deformed sample. FIG. 5(*a*) shows this step.

Step 2: After compression (step 1), a micro-indents array 520 is fabricated atop the pre-compressed PMMA sample 500 by a maximum load, $P_2$, using a micro hardness tester 530 (CSM Instrument), as described above. After a loading/unloading process, a residual stress field, $\sigma_{r2}$, is stored around the indents array 520. FIG. 5(*b*) shows this step.

Step 3: After indentation (step 2), the PMMA sample 500 is immersed in ethanol. Due to ethanol absorption, swelling happens in PMMA sample. Based on the residual stress-enhanced-swelling effect described previously, if $\sigma_{r2} > \sigma_{r1}$, the indent array 520 on the PMMA sample 500 swells into a micro-protrusion array 540, as shown in FIG. 5(*c*).

Step 4: In one embodiment of the present invention, after the micro-protrusion array 540 is formed, the PMMA sample 500 is placed into an oven for ethanol evaporation. Usually, and as described above, stable MLAs will be obtained after 24 hours at 60° C. The PMMA sample 500 is subsequently heated to 120° C. for 1-5 minutes, after which a stable compound microlens array 550 comprising a micro-protrusion array on a curved surface is obtained due to shape recovery in the PMMA sample, as shown in FIG. 5(*d*).

Procedure B

Figure 6:
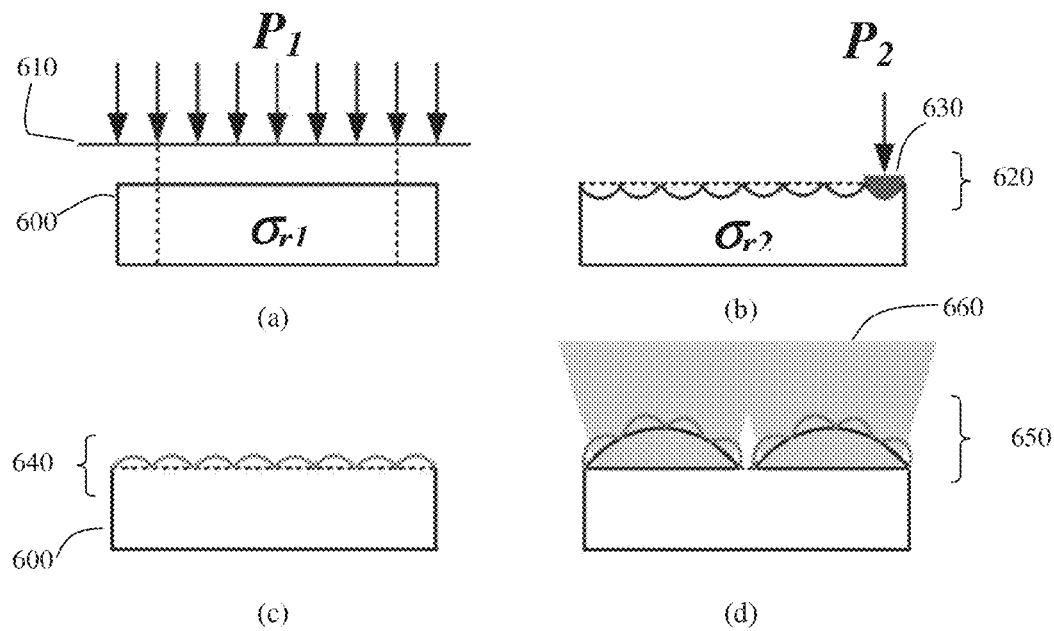
FIG. 6 is a schematic diagram showing the fabrication of compound MLAs according to Procedure B of the present invention.

Step 1: In a second embodiment of the present invention, a flat PMMA sample 600 is compressed by a maximum load, $P_i$, using an Instron testing machine 610. After a loading/unloading process, residual stress field, $\sigma_{r1}$, is stored in the deformed sample. FIG. 6(*a*) shows this step.

Step 2: After compression (step 1), a micro-indents array 620 is fabricated atop the pre-compressed PMMA sample 600 by a maximum load, $P_2$, using a micro hardness tester 630 (CSM Instrument). After a loading/unloading process, residual stress field, $\sigma_{r2}$, is stored around the indents array 620. FIG. 6(*b*) shows this step.

Step 3: After indentation (step 2), the PMMA sample 600 is immersed in ethanol. Due to ethanol absorption, swelling happens in PMMA sample. Based on the residual stress-enhanced-swelling effect described previously, if $\sigma_{r2} > \sigma_{r1}$, the indent array 620 on the PMMA sample 600 swells into a micro-protrusion array 640, as shown in FIG. 6(*c*).

Step 4: In a further embodiment of the present invention, after the micro-protrusion array 640 is formed, the PMMA sample 600 is placed into an oven for ethanol evaporation. Usually, and as described above, stable MLAs are obtained after 24 hours at 60° C. The PMMA sample 600 is subsequently heated by laser 660 or any other medium, whereby a stable compound microlens array 650 comprising at least one micro-protrusion array on at least one curved surface is obtained due to the local shape recovery process in the PMMA sample 600, as shown in FIG. 6(*d*).

Figure 7:
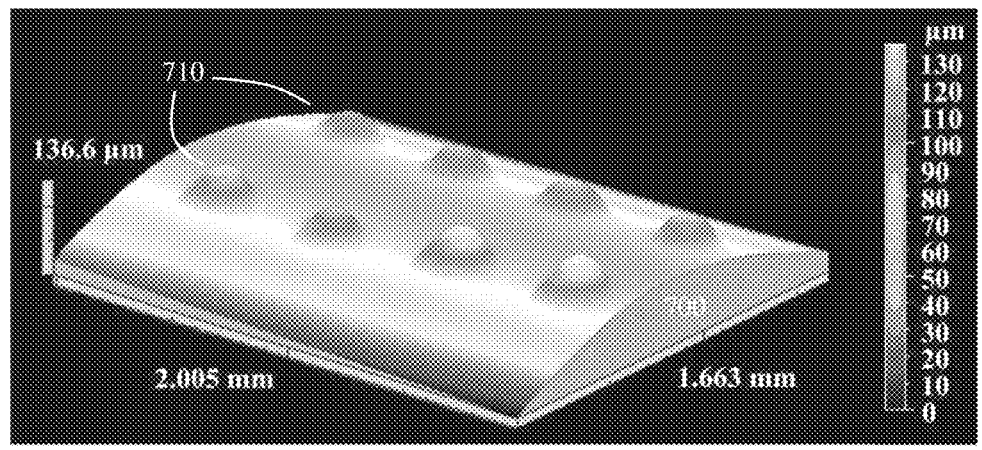
FIG. 7 is surface profile of a compound MLA fabricated based on Procedure A of the present invention.

In order to verify the method according to an embodiment of the present invention, a microlens array 710 provided on a curved or part-cylindrical PMMA substrate 700 was successfully fabricated based on Procedure A, and is shown in FIG. 7.

Commercial Applications

The compound microlens array with wide FOV exhibits a huge potential for medical, industrial, and military applications. Further applications include camcorders for omnidirectional surveillance imaging, vision sensors for flight navigation control in microflyers, collision-alert systems for visually impaired people, vision sensors for intelligent machines, robotics, and micro air vehicles, 3D microscopes, light emitting diodes, and medical devices.

Figure 8:
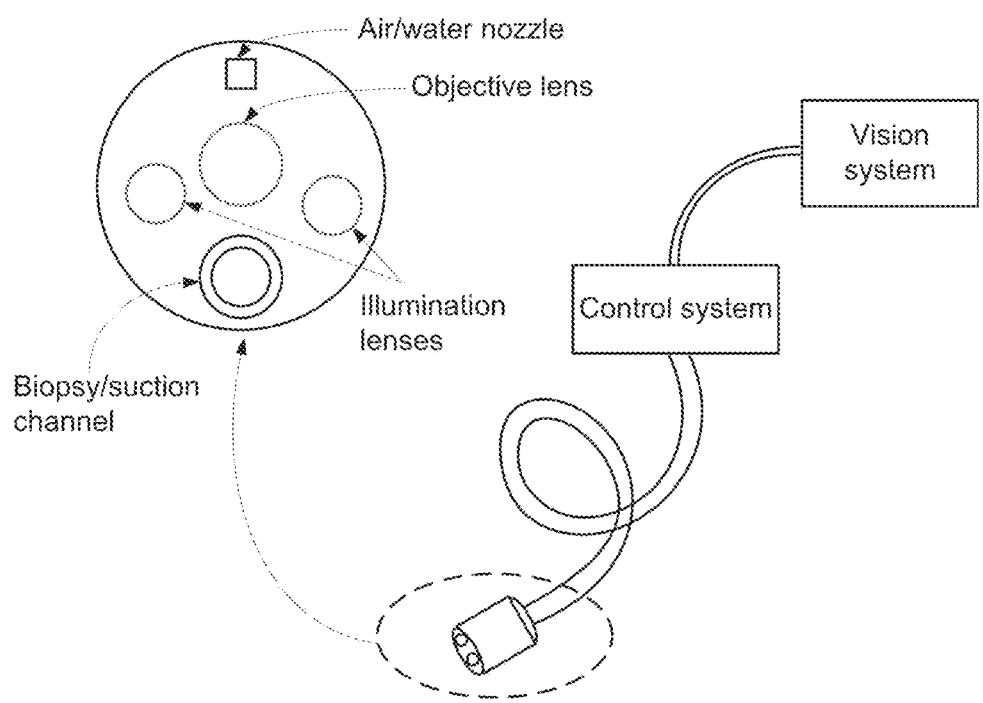
FIG. 8 is a schematic diagram showing the MLAs of the present invention used as objective and illumination lenses in an endoscope.

A further potential application of the MLA fabricated according to the present is shown at the end of an endoscope (see FIG. 8). There are two kinds of lenses at the end of the endoscope, both of which can be replaced by the MLAs fabricated according to the present invention. For illumination lenses, compound microlens arrays can provide wide illumination angle; for objective lenses, compound microlens arrays can capture image over a large FOV.

A comparison of different compound microlens array fabrication methods presently used with that of the present invention is summarised in Table 1 below.

TABLE 1

| | Methods | Procedures | Advantages | Disadvantages |
|---|---|---|---|---|
| Prior reported methods | Polymer replication (2006) | 8 steps | high aperture ratio; can patterning small curved surface, e.g. 8370 spherical lenses on a hemispherical polymer dome 2.5 mm in diameter; | Complex procedure; Time-consuming. |
| | Ultraprecision machining (2010) | 8 steps | Easy manipulation in machining | Difficult for micro-size, and spherical lenses machining; Difficult for patterning atop small curved surface (<20 mm in diameter). |
| | Laser lithography (2007) | 14 steps | Direct lithography process, good accuracy | Special equipment needed, complex procedure; Difficult for patterning atop small curved surface (<10 mm in diameter). |
| | Soft lithography (2007) | 5 steps | Simple procedure | Poor accuracy; poor optical performance. |
| This invention (embossing and swelling) | | 4 steps | Easy processing, simple, cost-effective, and good accuracy. | Difficult for patterning atop small curved surface (<5 mm in diameter). |

Whilst there have been described in the foregoing description exemplary embodiments, it will be understood by those skilled in the technology concerned that many variations or modifications in details of design or construction may be made without departing from the scope of the present invention. For example, while PMMA has been described above as the shape memory polymer substrate, other shape memory polymer substrates may also be used, such as polycarbonate (PC), polystyrene (PS), polyurethane (PU) and so on. Instead of ethanol, other chemicals capable of causing stress-enhanced swelling in the shape memory polymer substrate, such as methanol, may be used as the solvent in the solvent bath. However, ethanol is preferred as methanol is more harmful to the human body.

The invention claimed is:

1. A method of fabricating a microlens array, the method comprising the steps of:
    compressing a shape memory polymer substrate with a predetermined load;
    indenting the shape memory polymer substrate to form an array of micro-indents;
    immersing the shape memory polymer substrate in a solvent causing stress-enhanced swelling in the shape memory polymer substrate such that the array of micro-indents forms a corresponding array of micro-protrusions on the shape memory polymer substrate due to the stress-enhanced swelling of the micro-indents; and
    heating the shape memory polymer substrate to form at least one curved surface of the shape memory polymer substrate under the micro-protrusion array.

2. The method of claim 1, wherein the heating is at a heating temperature of at least 120° C.

3. The method of claim 1, wherein the heating temperature is applied for a period ranging from about 1 to about 5 minutes.

4. The method of claim 1, wherein the heating comprises local heating.

5. The method of claim 4, wherein the local heating is applied at a plurality of locations on the micro-protrusion array to form a plurality of curved surfaces of the shape memory polymer substrate under the micro-protrusion array.

6. The method of claim 4, wherein the local heating is provided by a laser.

7. The method of claim 1, wherein the shape memory polymer substrate has a curved surface before the compressing.

8. The method of claim 1, wherein the compressing leaves a first residual stress field in the shape memory polymer substrate and the indenting leaves a second residual stress field in the shape memory polymer substrate, wherein the stress-enhanced swelling occurs when the second residual stress field is greater than the first residual stress field.

9. The method of claim 1, wherein the shape memory polymer substrate comprises poly(methyl methacrylate) (PMMA).

10. The method of claim 1, wherein said solvent bath comprises ethanol at 95% concentration at a room temperature.

11. The method of claim 1, further comprising, before the heating, stabilising the micro-protrusion array in an oven after removal of the micro-protrusion array from the solvent.

12. The method of claim 11, wherein the stabilising is at a stabilising temperature in the range of about 60° C. to about 100° C.

13. The method of claim 11, wherein the stabilising temperature is applied for a period ranging from about a few minutes to 24 hours.

14. The method of claim 1, wherein each of the micro-protrusions has a diameter of about 40 μm and a height of about 1 μm.

15. The method of claim 14, wherein the focal length of each microlens is in a range from 240 μm to 500 μm.

* * * * *